(12) United States Patent
Swart et al.

(10) Patent No.: US 11,428,136 B2
(45) Date of Patent: Aug. 30, 2022

(54) HEATER DIAGNOSTICS IN HEAVY-DUTY MOTOR VEHICLE ENGINES

(71) Applicant: PACCAR Inc, Bellevue, WA (US)

(72) Inventors: Charles Wayne Reinhardt Swart, Bellingham, WA (US); Cynthia Chaffin Webb, Sedro-Woolley, WA (US); Maarten Meijer, Anacortes, WA (US); Varun Ramesh, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 17/002,534

(22) Filed: Aug. 25, 2020

(65) Prior Publication Data

US 2022/0025801 A1    Jan. 27, 2022

Related U.S. Application Data

(60) Provisional application No. 63/057,102, filed on Jul. 27, 2020, provisional application No. 63/056,131, (Continued)

(51) Int. Cl.
*F01N 3/20* (2006.01)
*B60Q 9/00* (2006.01)

(52) U.S. Cl.
CPC ............... *F01N 3/208* (2013.01); *B60Q 9/00* (2013.01); *F01N 3/2013* (2013.01); (Continued)

(58) Field of Classification Search
CPC ...... F01N 3/208; F01N 3/2033; F01N 3/2013; F01N 2900/0412; F01N 2900/1631; (Continued)

(56) References Cited

U.S. PATENT DOCUMENTS 5,447,696 A * 9/1995 Harada ................. F01N 13/011
                                                                422/174
8,778,290 B1    7/2014 Ren et al.
(Continued)

FOREIGN PATENT DOCUMENTS

CN          106246301 B     7/2019
DE      10 2010 034707 A1   2/2012
(Continued)

*Primary Examiner* — Brandon D Lee
(74) *Attorney, Agent, or Firm* — Seed Intellectual Property Law Group LLP

(57) ABSTRACT

A heavy duty truck includes a diesel engine, an exhaust after-treatment system, and an engine control unit. The exhaust after-treatment system may include one or more selective catalytic reduction systems, each with a respective heater, and each heater with a respective pair of temperature sensors, one upstream and the other downstream of the heater. Such systems may be used to perform diagnostic methods including populating a lookup table having heat energy supplied to an exhaust gas stream by the diesel engine as a first independent variable, heat energy supplied to the exhaust gas stream by a heater as a second independent variable, and a resulting temperature as an output. Such a lookup table can be used to maintain a temperature of the exhaust gas flow at a constant target temperature.

16 Claims, 2 Drawing Sheets

Related U.S. Application Data filed on Jul. 24, 2020, provisional application No. 63/054,468, filed on Jul. 21, 2020.

(52) U.S. Cl.
CPC .... *F01N 3/2033* (2013.01); *F01N 2900/0412* (2013.01); *F01N 2900/1404* (2013.01); *F01N 2900/1411* (2013.01); *F01N 2900/1602* (2013.01); *F01N 2900/1631* (2013.01)

(58) Field of Classification Search
CPC ..... F01N 2900/1602; F01N 2900/1404; F01N 2900/1411; B60Q 9/00
See application file for complete search history.

(56) References Cited

U.S. PATENT DOCUMENTS

| | | | |
|---|---|---|---|
| 10,690,033 B1 | 6/2020 | Johnson et al. | |
| 10,753,255 B2 | 8/2020 | Schweizer | |
| 10,760,513 B1 | 9/2020 | Huhn et al. | |
| 10,920,641 B2 | 2/2021 | Kinnaird et al. | |
| 11,035,274 B2 | 6/2021 | Johansson et al. | |
| 2004/0094341 A1* | 5/2004 | Appa | B60L 15/2045 180/65.245 |
| 2004/0128983 A1 | 7/2004 | Okada et al. | |
| 2006/0153761 A1 | 7/2006 | Bandl-Konrad et al. | |
| 2007/0079605 A1 | 4/2007 | Hu et al. | |
| 2007/0082783 A1 | 4/2007 | Hu et al. | |
| 2007/0122317 A1 | 5/2007 | Driscoll et al. | |
| 2007/0193253 A1 | 8/2007 | Tsumagari | |
| 2008/0072575 A1 | 3/2008 | Yan | |
| 2009/0035194 A1 | 2/2009 | Robel et al. | |
| 2009/0158706 A1 | 6/2009 | Sun | |
| 2009/0183501 A1 | 7/2009 | Gonze et al. | |
| 2011/0000194 A1 | 1/2011 | Gonze et al. | |
| 2011/0047964 A1 | 3/2011 | Yezerets et al. | |
| 2011/0061372 A1 | 3/2011 | Levijoki et al. | |
| 2011/0265452 A1 | 11/2011 | Geveci et al. | |
| 2011/0271660 A1 | 11/2011 | Gonze et al. | |
| 2012/0085082 A1 | 4/2012 | Levijoki et al. | |
| 2013/0232958 A1 | 9/2013 | Ancimer et al. | |
| 2013/0311065 A1 | 11/2013 | Sun et al. | |
| 2014/0033683 A1 | 2/2014 | Wei et al. | |
| 2014/0144220 A1* | 5/2014 | Ardanese | F01N 11/007 73/114.75 |
| 2014/0363358 A1 | 12/2014 | Udd et al. | |
| 2015/0040540 A1 | 2/2015 | Hulser et al. | |
| 2015/0040543 A1 | 2/2015 | Shetney et al. | |
| 2015/0096287 A1 | 4/2015 | Qi | |
| 2015/0275730 A1 | 10/2015 | Gupta et al. | |
| 2015/0276694 A1 | 10/2015 | Lahr | |
| 2015/0314239 A1 | 11/2015 | Kawaguchi et al. | |
| 2015/0337702 A1 | 11/2015 | Ettireddy et al. | |
| 2016/0032803 A1 | 2/2016 | Ettireddy et al. | |
| 2016/0186629 A1 | 6/2016 | Osburn et al. | |
| 2016/0186630 A1 | 6/2016 | Osburn et al. | |
| 2017/0051654 A1 | 2/2017 | Gupta et al. | |
| 2017/0122159 A1 | 5/2017 | Bahrami | |
| 2017/0130629 A1 | 5/2017 | Nagel et al. | |
| 2017/0175604 A1* | 6/2017 | Devarakonda | F01N 13/008 |
| 2017/0234199 A1 | 8/2017 | Sun et al. | |
| 2018/0080359 A1 | 3/2018 | Price et al. | |
| 2018/0087426 A1 | 3/2018 | Dou et al. | |
| 2018/0163589 A1 | 6/2018 | David et al. | |
| 2018/0230879 A1 | 8/2018 | Saitoh et al. | |
| 2018/0252136 A1 | 9/2018 | Concetto Pesce et al. | |
| 2018/0274420 A1 | 9/2018 | Kleinknecht et al. | |
| 2018/0274421 A1* | 9/2018 | Smith | F01N 3/2013 |
| 2018/0334939 A1 | 11/2018 | Mital et al. | |
| 2018/0345217 A1* | 12/2018 | Goffe | B01J 35/0006 |
| 2018/0345218 A1 | 12/2018 | Goffe | |
| 2019/0155230 A1 | 5/2019 | Culbertson et al. | |
| 2019/0360415 A1* | 11/2019 | Romanato | F01N 9/00 |
| 2019/0383189 A1 | 12/2019 | Dou et al. | |
| 2020/0063634 A1 | 2/2020 | Smith et al. | |
| 2020/0316571 A1 | 10/2020 | Goffe | |
| 2020/0332691 A1 | 10/2020 | Soeger et al. | |
| 2021/0079826 A1 | 3/2021 | Voss et al. | |
| 2021/0095590 A1 | 4/2021 | Bastoreala et al. | |
| 2022/0010713 A1 | 1/2022 | McCarthy, Jr. et al. | |

FOREIGN PATENT DOCUMENTS

| | | |
|---|---|---|
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

\* cited by examiner

HEATER DIAGNOSTICS IN HEAVY-DUTY MOTOR VEHICLE ENGINES

BACKGROUND

Technical Field

The present disclosure relates generally to energy-based exhaust heater diagnostics in heavy-duty motor vehicle engines.

Description of the Related Art

Regulated emissions from today's heavy-duty engines demand very low levels of tailpipe emissions, and standards are expected to be further reduced in the near future. To reduce tailpipe exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen ($NO_x$), and/or an ammonia oxidation catalyst (AMOX). Performance of EAS systems, and of SCR systems in particular, is dependent upon exhaust gas temperature and other parameters.

SCR processes use catalysts to catalyze the $NO_x$ reduction and a fluid referred to as DEF (diesel emission fluid), which acts as a $NO_x$ reductant over the SCR catalyst. DEF is an aqueous solution that evaporates and decomposes to chemically release ammonia so that the ammonia is available for reaction. Efficiency of SCR operation is dependent upon temperature. For example, DEF evaporation and decomposition is dependent upon temperature, with higher temperatures (e.g., temperatures over 150, 160, 170, 180, 190, 200, 250, 300, or 350 degrees Celsius) generally improving performance. Temperature levels required to ensure compliance with emissions regulations may be highly dependent upon a wide variety of variables and are in some cases determined experimentally for specific engines, trucks, and operating conditions thereof. Thus, an EAS may include a heater to increase the temperature of the exhaust, to facilitate DEF injection, evaporation, and decomposition at rates sufficient to allow efficient performance of the SCR processes.

BRIEF SUMMARY

A method may be summarized as comprising: operating a diesel engine of a heavy-duty truck such that the diesel engine generates an exhaust gas flow; and while operating the diesel engine, operating an exhaust after-treatment system of the heavy-duty truck to maintain a temperature of the exhaust gas flow at a selective catalytic reduction system of the exhaust after-treatment system at a constant target temperature; wherein operating the exhaust after-treatment system to maintain the temperature at the constant target temperature includes calculating a rate at which heat energy is provided from the diesel engine to the exhaust gas flow, calculating a rate at which heat energy is provided from a heater of the exhaust after-treatment system to the exhaust gas flow, determining an expected value of the temperature using the calculated rates at which heat energy is provided from the diesel engine and the heater to the exhaust gas flow, comparing the expected value of the temperature to a measurement of the temperature, and using a result of the comparison to adjust operation of the exhaust after-treatment system.

The target temperature may minimize a fuel penalty incurred by operation of the selective catalytic reduction system while ensuring effective operation of the selective catalytic reduction system. The target temperature may be at least 150 degrees Celsius or at least 190 degrees Celsius. Calculating the rate at which heat energy is provided from the diesel engine to the exhaust gas flow may include averaging a product of a temperature of the exhaust gas flow as it enters the exhaust after-treatment system, a mass flow rate of the exhaust gas flow, and a molar specific heat of the exhaust gas flow across a moving average window of time. Calculating the rate at which heat energy is provided from the heater to the exhaust gas flow may include averaging a level of power consumed by the heater across a moving average window of time.

A lookup table may be updated to replace the expected value of the temperature with the measured temperature. Using the result of the comparison to adjust operation of the exhaust after-treatment system may include reducing fuel or power supplied to the heater when the measured temperature is greater than the expected value of the temperature. Using the result of the comparison to adjust operation of the exhaust after-treatment system may include increasing power supplied to the heater when the measured temperature is less than the expected value of the temperature.

The method may further comprise: calculating a target energy level for the exhaust gas flow at the selective catalytic reduction system based on the target temperature, a mass flow rate of the exhaust gas flow, and a molar specific heat of the exhaust gas flow; determining an operational level of fuel or power for the heater based on the target energy level and the rate at which heat energy is provided from the diesel engine to the exhaust gas flow; and operating the heater at the operational level of power. The method may further comprise illuminating a malfunction indicator lamp in a cabin of the heavy-duty truck when the exhaust after-treatment system is unable to maintain the temperature at the constant target temperature.

The method may include calculating a rate at which heat energy is provided from the diesel engine to the exhaust gas flow at a frequency of at least once every minute and calculating a rate at which heat energy is provided from the heater to the exhaust gas flow at a frequency of at least once every minute, for at least five minutes. The method may include determining an expected value of the temperature using the calculated rates at which heat energy is provided from the diesel engine and the heater to the exhaust gas flow at a frequency of at least once every minute, comparing the expected value of the temperature to the measured temperature at a frequency of at least once every minute, and using a result of the comparison to adjust operation of the exhaust after-treatment system at a frequency of at least once every minute, for at least five minutes.

The selective catalytic reduction system may be a close-coupled selective catalytic reduction system or an under-body selective catalytic reduction system. The temperature may be measured by a first temperature sensor downstream of the heater with respect to the exhaust gas flow. A temperature of the exhaust gas flow as it enters the exhaust after-treatment system may be monitored by a second temperature sensor upstream of the heater with respect to the exhaust gas flow.

A method may be summarized as comprising: operating a heavy-duty diesel engine at steady state at a first set of operating conditions such that the heavy-duty engine generates a first exhaust gas flow; calculating a first rate at which heat energy is provided to the first exhaust gas flow from the heavy-duty engine and storing the calculated first rate at which heat energy is provided to the first exhaust gas flow from the heavy-duty engine as a first independent variable of a first entry in a lookup table; calculating a first rate at which heat energy is provided to the first exhaust gas flow from a heater and storing the calculated first rate at which heat energy is provided to the first exhaust gas flow from the heater as a second independent variable of the first entry in the lookup table; storing a first measured temperature of the first exhaust gas flow at a selective catalytic reduction system of the exhaust after-treatment system as an output of the first entry in the lookup table; operating the heavy-duty diesel engine at steady state at a second set of operating conditions that is different than the first set of operating conditions such that the heavy-duty engine generates a second exhaust gas flow; calculating a second rate at which heat energy is provided to the second exhaust gas flow from the heavy-duty engine and storing the calculated second rate at which heat energy is provided to the second exhaust gas flow from the heavy-duty engine as a first independent variable of a second entry in the lookup table; calculating a second rate at which heat energy is provided to the second exhaust gas flow from the heater and storing the calculated second rate at which heat energy is provided to the second exhaust gas flow from the heater as a second independent variable of the second entry in the lookup table; and storing a second measured temperature of the second exhaust gas flow at the selective catalytic reduction system of the exhaust after-treatment system as an output of the second entry in the lookup table.

A heavy-duty truck may be summarized as comprising: a diesel engine; an exhaust after-treatment system having an upstream end and a downstream end opposite the upstream end, the upstream end coupled to the diesel engine, the exhaust after-treatment system including: a first temperature sensor; a heater downstream of the first temperature sensor; a second temperature sensor downstream of the heater; and a selective catalytic reduction system downstream of the second temperature sensor.

The heavy-duty truck may further comprise an engine control unit configured to: operate the diesel engine such that the diesel engine generates an exhaust gas flow; and during operation of the diesel engine, operate the exhaust after-treatment system to maintain a temperature measured by the second temperature sensor at a constant target temperature by calculating a rate at which heat energy is provided from the diesel engine to the exhaust gas flow, calculating a rate at which heat energy is provided from the heater to the exhaust gas flow, using the calculated rates at which heat energy is provided to the exhaust gas flow as first and second inputs to a lookup table to determine an expected value of the temperature measured by the second temperature sensor, comparing the expected value of the temperature measured by the second temperature sensor to a temperature measured by the second temperature sensor, and using a result of the comparison to adjust operation of the exhaust after-treatment system.

DETAILED DESCRIPTION

Figure 1:
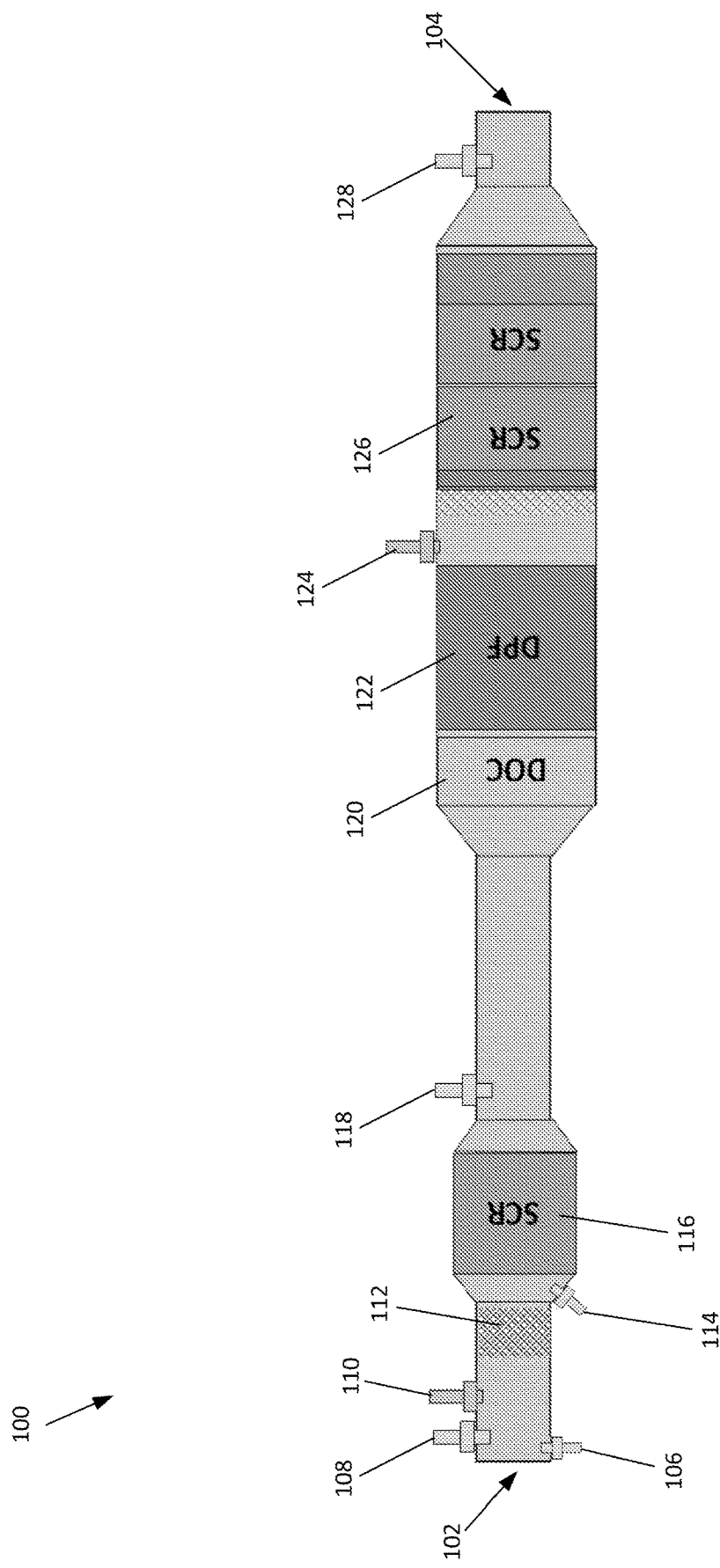
FIG. 1 illustrates a diagram of an exhaust after-treatment system including a DOC, a DPF, and dual SCR systems.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

As described herein, experiments may be performed and measurements may be taken while an engine or a vehicle including an engine are operating at "steady state." As used herein, the term "steady state" may mean that the engine or the vehicle including the engine are operating with all operating parameters, including engine speed, power level, etc., unchanged or substantially unchanged over a period of time of at least one, at least two, at least three, at least four, at least five, at least six, or at least ten seconds. Traditionally, heavy-duty vehicles included many components of exhaust after-treatment systems "underbody," that is, underneath the engine, cab, or another portion of the vehicle, where space is relatively freely available and these components can therefore generally be larger than would otherwise be practical. Some modern heavy-duty vehicles, however, have begun to include a "close-coupled," "up-close," or "light-off" SCR unit much closer to the engine and exhaust ports thereof (e.g., adjacent to a turbine outlet of a turbocharger) and upstream of the traditional underbody exhaust after-treatment system, which can provide certain advantages in that the temperature of the engine exhaust may be higher when it is closer to the engine, although locating an SCR unit nearer the engine limits the available space and thus its practical size. Thus, some modern heavy-duty vehicles have included both a "close-coupled" SCR unit upstream with respect to the flow of the exhaust, such as adjacent to a turbine outlet of a turbocharger, to take advantage of the higher exhaust temperatures, as well as an "underbody" SCR unit downstream with respect to the flow of the exhaust, such as under the engine or cab of the vehicle, to take advantage of the greater available space.

FIG. 1 illustrates a diagram of an exhaust after-treatment system 100 that has a first, upstream end 102 and a second, downstream end 104 opposite to the first, upstream end 102. The exhaust after-treatment system 100 is a component of a vehicle, such as a large, heavy-duty, diesel truck, and in use carries exhaust from the diesel engine of the truck to a tailpipe of the truck. For example, the first, upstream end 102 of the exhaust after-treatment system 100 may be coupled directly to an exhaust port or an outlet port of the diesel engine, such as a turbine outlet of a turbocharger thereof, and the second, downstream end 104 may be coupled directly to an inlet port of a tailpipe or muffler of the truck. Thus, when the engine is running and generating exhaust, the exhaust travels along the length of the exhaust after-treatment system 100 from the first, upstream end 102 thereof to the second, downstream end 104 thereof.

As illustrated in FIG. 1, the exhaust after-treatment system 100 includes, at its first, upstream end 102, or proximate or adjacent thereto, a first temperature sensor 106, which may be a thermocouple, to measure the temperature of the exhaust gas flow as it leaves the engine and enters the exhaust after-treatment system 100, before heat begins to be lost through the exhaust after-treatment system 100 to the environment. The exhaust after-treatment system 100 also includes, at its first, upstream end 102, or proximate or adjacent thereto, or just downstream of the first temperature sensor 106, a first $NO_x$ sensor 108, to measure the content of $NO_x$ gases in the exhaust gas flow as it leaves the engine and enters the exhaust after-treatment system 100. The exhaust after-treatment system 100 also includes, at its first, upstream end 102, or proximate or adjacent thereto, or just downstream of the first $NO_x$ sensor 108, a first DEF injector 110, to inject DEF into the exhaust gas flow as it leaves the engine and enters the exhaust after-treatment system 100.

The exhaust after-treatment system 100 also includes, proximate or adjacent its first, upstream end 102, or just downstream of the first DEF injector 110, a heater 112, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the heater 112, a second temperature sensor 114, which may be a thermocouple, to measure the temperature of the exhaust gas flow as it leaves the heater 112 and just before or just as it enters a first, close-coupled SCR system 116, or at the inlet to the close-coupled SCR system 116. The exhaust after-treatment system 100 also includes, just downstream of the heater 112 and the second temperature sensor 114, the first, close-coupled SCR system 116, which is configured to reduce oxides of nitrogen ($NO_x$) in the exhaust gas flow.

The exhaust after-treatment system 100 also includes, just downstream of the first SCR system 116, a second $NO_x$ sensor 118, to measure the content of $NO_x$ gases in the exhaust gas flow as it leaves the first SCR system 116. In practice, the first $NO_x$ sensor 108 and the second $NO_x$ sensor 118 can be used together to monitor, assess, or measure the performance of the first SCR system 116. Together, the first temperature sensor 106, the first $NO_x$ sensor 108, the first DEF injector 110, the heater 112, the second temperature sensor 114, the first, close-coupled SCR system 116, and the second $NO_x$ sensor 118 can be referred to as a close-coupled portion of the exhaust after-treatment system 100, as they can be collectively located at or adjacent to the engine of the vehicle.

The exhaust after-treatment system 100 also includes, downstream of the first SCR system 116 and the second $NO_x$ sensor 118, a DOC component 120, to oxidize unburned fuel and carbon monoxide in the exhaust gas flow. The exhaust after-treatment system 100 also includes, downstream of the DOC component 120, a DPF 122, to reduce or otherwise control particulate matter in the exhaust gas flow. The exhaust after-treatment system 100 also includes, downstream of the DPF 122, a second DEF injector 124, to inject DEF into the exhaust gas flow as it leaves the DPF 122. The exhaust after-treatment system 100 also includes, downstream of the second DEF injector 124, a second, underbody SCR system 126, which is configured to reduce oxides of nitrogen ($NO_x$) in the exhaust gas flow. The exhaust after-treatment system 100 also includes, just downstream of the second SCR system 126 and at its second, downstream end 104, or proximate or adjacent thereto, a third $NO_x$ sensor 128, to measure the content of $NO_x$ gases in the exhaust gas flow as it leaves the second SCR system 126.

In practice, the second $NO_x$ sensor 118 and the third $NO_x$ sensor 128 can be used together to monitor, assess, or measure the performance of the second SCR system 126. Together, the DOC component 120, the DPF 122, the second DEF injector 124, the second SCR system 126, and the third $NO_x$ sensor 128 can be referred to as an underbody portion of the exhaust after-treatment system 100, as they can be collectively located underneath the engine, cab, or another portion of the vehicle.

As noted previously, performance of exhaust after-treatment systems, and of SCR systems in particular, is dependent upon exhaust gas temperature. More specifically, DEF evaporation and decomposition is dependent upon temperature, with higher temperatures generally improving performance. Thus, operation of a heater to increase the temperature of the exhaust gas flow can be critical to maintaining compliance with emissions regulations. Nevertheless, operation of a heater to increase the temperature of the exhaust gas flow naturally incurs a fuel penalty and thus a reduction of overall system fuel efficiency. Thus, it is critical to ensure accurate and precise performance of such heaters, to ensure compliance with emissions standards without unduly reducing overall fuel efficiency.

It has been found that the performance of heaters used in exhaust after-treatment systems degrades over time, due to a variety of factors such as aging, abuse through overheating, and/or failure of other components, including fuel injectors. Thus, in order to ensure that such heaters are performing adequately, that is, heating exhaust gas flow temperatures to within acceptable temperature ranges, the importance of monitoring heater performance has now been recognized. Thus, to monitor the performance of heaters in exhaust after-treatment systems, such as the heater 112 in the exhaust after-treatment system 100, such systems may be provided with a first temperature sensor, such as the first temperature sensor 106 in the exhaust after-treatment system 100, upstream of the heater and a second temperature sensor, such as the second temperature sensor 114, downstream of the heater. It has further been found that measurements of temperatures upstream and downstream of a heater provide only partial insight into the performance of the heater, because a numerical increase in temperature provided by the heater depends on other variables, such as the mass flow rate of the exhaust gas flow being heated by the heater. Thus, it has been found to be advantageous to monitor performance of a heater in an exhaust after-treatment system in accordance with the techniques described herein.

First, an initial lookup table is built or populated under ideal or idealized conditions in accordance with standardized laboratory experiments. Such experiments may operate a heavy-duty diesel engine at steady state under a variety of operating conditions to determine properties of the exhaust gas flow generated by the engine at steady state under such conditions. Such operating conditions may include a level of power drawn by the heater 112. For example, for each set of given operating conditions, the experiments may measure a mass flow rate ($\dot{m}_{exh}$) of the exhaust gas flow generated by the engine, which may be specified in units such as kg/s, determine a resulting molar specific heat at constant pressure ($C_p$) of the exhaust gas flow generated by the engine (which may be unique to each individual engine but may be expected to be constant over the range of operation of any given engine), and measure a resulting exhaust temperature ($T_1$) of the exhaust gas flow generated by the engine immediately adjacent to an exhaust port or outlet port of the engine itself, such as a turbine outlet of a turbocharger thereof, which may be measured by the first temperature sensor 106 and may be specified in units such as K or degrees Celsius, a level of power drawn or consumed by the heater 112, which may be specified in units of W (in the case of an electrically-powered resistive heater, the level of power drawn by the heater 112 may be computed as the square of a measured current drawn by the heater multiplied by a known resistance of the heater), and a resulting exhaust temperature ($T_2$) of the exhaust gas flow adjacent to or just downstream of the heater 112, which may be measured by the second temperature sensor 114 and may be specified in units such as K or degrees Celsius.

From such data, the experiments may determine a resulting exhaust energy provided per unit time directly from the diesel engine itself and apart from any energy provided in the form of heat energy by the heater 112, in units such as W. To determine such resulting exhaust energy under the given operating conditions of the engine, a product of the mass flow rate ($\dot{m}_{exh}$), the molar specific heat at constant pressure ($C_p$), and the exhaust temperature ($T_1$) of the exhaust gas flow, as measured by the first temperature sensor 106, can be calculated. The resulting determined or calculated exhaust energy (in units of power) can be stored as a first independent variable or dimension of the lookup table.

From such data, the experiments may also determine a resulting input exhaust energy provided by the heater 112, such as by determining a level of power consumed by the heater 112. The resulting determined or calculated input exhaust energy (in units of power) can be stored as a second independent variable or dimension of the lookup table. The resulting exhaust temperature ($T_2$), as measured by the second temperature sensor 114, of the exhaust gas flow adjacent to or just downstream of the heater 112 can be stored as the output variable or dimension of the lookup table.

Second, during operation of a vehicle, such as a motor vehicle such as a heavy-duty diesel truck, the exhaust after-treatment system 100, including the heater 112, is operated to ensure that the temperature of the exhaust gas flow entering the first, close-coupled SCR system 116, at the inlet thereof, is at a target temperature (such a target temperature may in some cases be a proxy for a desired bed temperature of the first, close-coupled SCR system 116), where the target temperature is known or determined in advance to ensure effective operation of the SCR system while minimizing an incurred fuel penalty, as described elsewhere herein. For example, the target temperature may be selected to ensure adequate DEF evaporation and decomposition, and may be at least 150, 160, 170, 180, 190, or 200 degrees Celsius, and/or no more than 160, 170, 180, 190, 200, or 210 degrees Celsius.

For example, an Engine Control Unit ("ECU") of the truck may measure or continuously monitor a current mass flow rate ($\dot{m}_{exh}$) of the exhaust gas flow generated by the engine, which may be specified in units such as kg/s, a resulting current exhaust temperature ($T_1$) of the exhaust gas flow generated by the engine immediately adjacent to an exhaust port or outlet port of the engine itself, such as a turbine outlet of a turbocharger thereof, which may be measured by the first temperature sensor 106 and may be specified in units such as K or degrees Celsius, a current level of power drawn or consumed by the heater 112, which may be specified in units of kW (in the case of an electrically-powered resistive heater, the level of power drawn by the heater 112 may be computed as the square of a measured current drawn by the heater multiplied by a known resistance of the heater), and a resulting current exhaust temperature ($T_2$) of the exhaust gas flow adjacent to or just downstream of the heater 112, which may be measured by the second temperature sensor 114 and may be specified in units such as K or degrees Celsius.

The engine control unit of the truck may also calculate a target energy level (in units of power) for the exhaust gas flow at the inlet to the first, close-coupled SCR system 116, by multiplying the target temperature by the current mass flow rate and the molar specific heat of the exhaust gas flow. The engine control unit of the truck may also calculate a current exhaust energy (in units of power) provided directly from the diesel engine itself and apart from any energy provided by the heater 112, such as by multiplying the current exhaust temperature ($T_1$), as measured by the first temperature sensor 106, by the current mass flow rate and the molar specific heat of the exhaust gas flow. The engine control unit can then calculate or determine operational parameters for the heater 112, such as a level of supplemental heat energy (in units of power) to be provided by the heater 112, by subtracting the current exhaust energy (in units of power) provided directly from the diesel engine itself from the target energy level (in units of power) for the exhaust gas flow at the inlet to the first, close-coupled SCR system 116. The engine control unit can then operate the heater 112 to provide supplemental heat energy at the calculated rate to the exhaust gas flow.

As the truck and its engine and its engine control unit are operating in this manner, the engine control unit can continually calculate a rate at which exhaust heat energy is provided directly from the diesel engine itself and apart from any energy provided by the heater 112, such as by averaging a product of the current exhaust temperature ($T_1$), as measured by the first temperature sensor 106, the current mass flow rate, and the molar specific heat of the exhaust gas flow across a moving average window of time. As the truck and its engine and its engine control unit are operating, the engine control unit can also continually calculate a rate at which supplemental input exhaust energy is provided by the heater 112, such as by averaging a level of power consumed by the heater 112 (or a square of a current drawn by the heater 112 multiplied by the resistance of the heater 112) across a moving average window of time, which may be the same as the moving average window of time used to calculate the rate at which exhaust heat energy is provided directly from the diesel engine.

Once such calculations have been completed, the calculated rate of exhaust energy provided directly from the diesel engine and the rate of supplemental input exhaust energy provided by the heater 112 can be used as first and second inputs, respectively, to the lookup table previously built to determine an expected temperature of the exhaust gas flow just downstream of the heater 112 and at the inlet to the first, close-coupled SCR system 116. In some implementations, the calculated rate of exhaust energy provided directly from the diesel engine may be rounded either up or down to the closest entry in the lookup table, and the calculated rate of supplemental input exhaust energy provided by the heater 112 may be rounded either up or down to the closest entry in the lookup table. The engine control unit can then compare this expected temperature of the exhaust gas flow just downstream of the heater 112 and at the inlet to the first, close-coupled SCR system 116 to the resulting exhaust temperature ($T_2$) of the exhaust gas flow adjacent to or just downstream of the heater 112, as actually measured by the second temperature sensor 114.

If the expected temperature matches the measured temperature, then operation of the vehicle, the engine, the engine control unit, and the exhaust after-treatment system 100 can continue. If the expected temperature does not match the measured temperature, however, then the lookup table can be updated to replace the previous entry for the expected temperature at the calculated energy levels with the measured temperature. Thus, the lookup table is adaptive and continually built, refined, and/or updated over time based on feedback from the continued operation of the vehicle, the engine, the exhaust after-treatment system 100, and the engine control unit.

Furthermore, if the measured temperature is greater than the expected temperature, then the engine control unit can reduce the power supplied to the heater 112, to reduce the fuel consumed by operating the heater 112. On the other hand, if the measured temperature is less than the expected temperature, which is expected to be the more common outcome and indicative of aging, wear, damage, or deterioration to the heater 112, then the engine control unit can increase the power supplied to the heater 112, which may increase the fuel consumed by operating the heater 112, but will ensure that the heater 112 provides sufficient supplemental energy to the exhaust gas flow to ensure that emissions regulations can be complied with.

Figure 2:
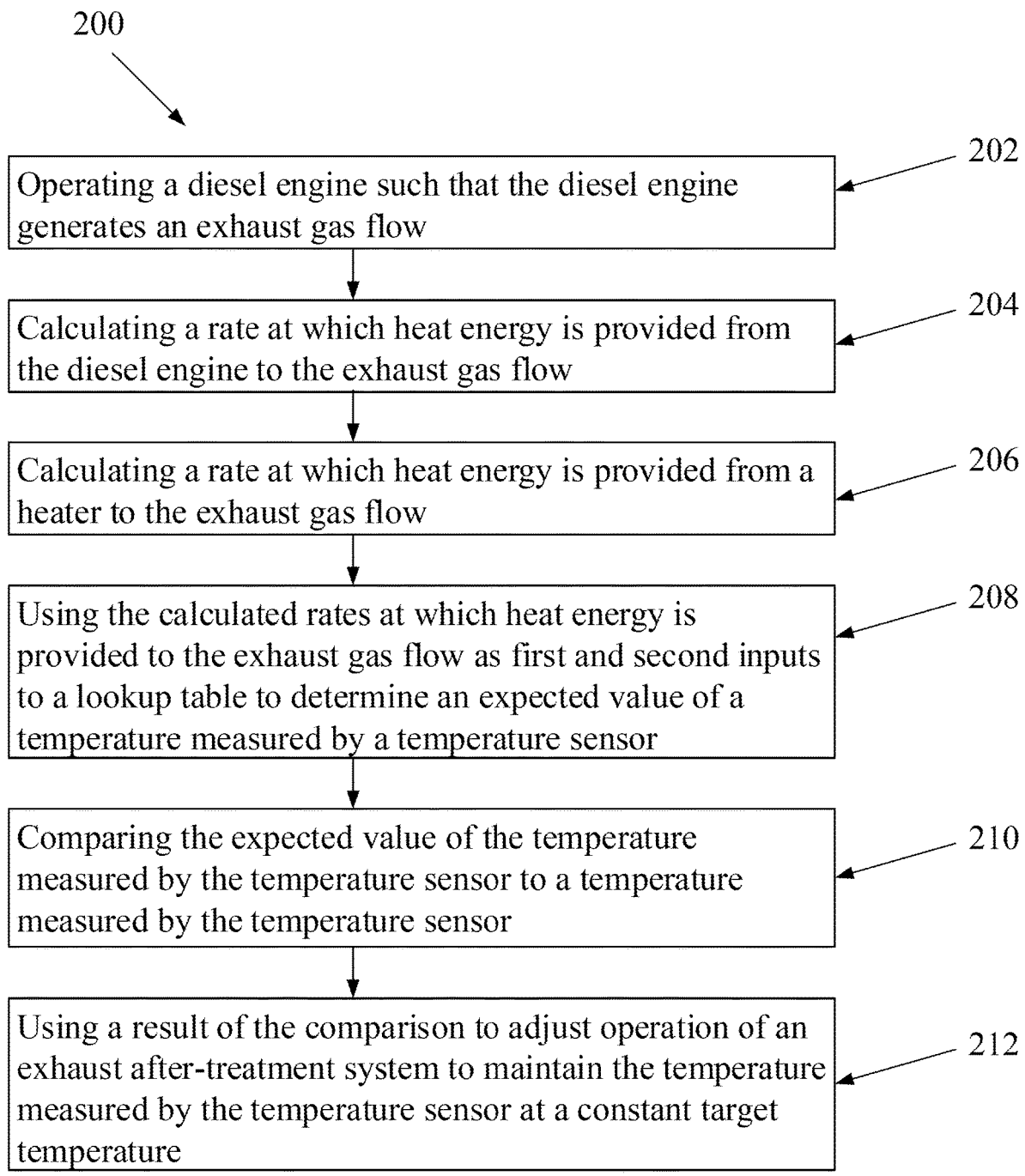
FIG. 2 illustrates a flow chart of a method of using the systems described herein.

FIG. 2 illustrates a flow chart 200 of a summarized version of a method in accordance with the present disclosure. As illustrated in FIG. 2, the method includes, at 202, operating a diesel engine such that the diesel engine generates an exhaust gas flow. The method further includes, at 204, calculating a rate at which heat energy is provided from the diesel engine to the exhaust gas flow, and at 206, calculating a rate at which heat energy is provided from a heater to the exhaust gas flow. The method further includes, at 208, using the calculated rates at which heat energy is provided to the exhaust gas flow as first and second inputs to a lookup table to determine an expected value of a temperature measured by a temperature sensor, and at 210, comparing the expected value of the temperature measured by the temperature sensor to a temperature measured by the temperature sensor. Finally, the method also includes, at 212, using a result of the comparison to adjust operation of an exhaust after-treatment system to maintain the temperature measured by the temperature sensor at a constant target temperature.

If the performance of the heater 112 has degraded over time or deteriorated to an extent that the heater 112 is no longer capable of providing sufficient heat energy to raise the temperature of the exhaust gas flow to the target temperature for extended periods of time (that is, it has crossed a lower threshold for acceptable performance), then the engine control unit may resort to adjustment of operating parameters of other exhaust after-treatment system components to compensate for the less than sufficient operation or performance of the heater 112, and/or illuminate a malfunction indicator lamp (MIL) in the dashboard or elsewhere within the cabin of the vehicle. In some implementations, an extended period of time, in this context, may be five minutes, thirty minutes, an hour, or eight hours. In some implementations, an extended period of time, in this context, may be consecutive time, or total time over the course of thirty minutes, an hour, or eight hours. The techniques described herein may be referred to as diagnostics for heaters in exhaust after-treatment systems.

The systems, components, techniques, methods, and actions described herein can operate continuously, while a truck is driving, over the entire lifetime of the truck. Thus, the techniques described herein can be useful, among other things, to modify the performance of the heater 112 of the exhaust after-treatment system 100 to compensate for aging or degradation of the heater 112 over time. As used herein, the terminology "operate continuously" or "continuous operation" can mean that the engine control unit of the truck calculates the exhaust energy provided directly from the diesel engine and determines operational parameters for the heater 112 based on the exhaust energy provided directly from the diesel engine, and adjusts performance of the heater 112 accordingly, with a frequency of at least once every second, once every five seconds, once every ten seconds, once every thirty seconds, or once every minute, such as over a period of five minutes, thirty minutes, an hour, or eight hours. As used herein, the terminology "operate continuously" or "continuous operation" can also mean that the engine control unit of the truck determines the expected temperature of the exhaust gas flow at the inlet to the first, close-coupled SCR system 116 and compares the expected temperature to the exhaust temperature measured by the second temperature sensor 114 with a frequency of at least once every second, once every five seconds, once every ten seconds, once every thirty seconds, or once every minute, such as over a period of five minutes, thirty minutes, an hour, or eight hours. As used herein, the terminology "operate continuously" or "continuous operation" can also mean that such actions are performed over a period of time of at least one month, three months, six months, one year, two years, five years, or ten years.

The description provided herein relates specifically to the heater 112, which is located just upstream of the first, close-coupled SCR 116, and the first and second temperature sensors 106 and 114. In some implementations, the second, underbody SCR 126 can be provided with an additional heater such that the additional heater has features with respect to the underbody SCR 126 that correspond to or match the features of the heater 112 with respect to the close-coupled SCR 116. In some implementations, the second, underbody SCR 126 and the additional heater can further be provided with additional temperature sensors such that the additional temperature sensors have features with respect to the underbody SCR 126 and the additional heater that correspond to or match the features of the first and second temperature sensors 106 and 114 with respect to the close-coupled SCR 116 and the heater 112. In such embodiments, the additional temperature sensors can have features corresponding to those described for the first and second temperature sensors 106 and 114, the additional heater can have features corresponding to those of the heater 112, and the underbody SCR 126 can have features corresponding to those of the close-coupled SCR 116.

In other embodiments, the exhaust after-treatment system 100 may include three, four, or any other number of independent SCR systems, together with respective heaters and temperature sensors. Each of the SCR systems and respective heaters and temperature sensors can have features corresponding to those described herein for the close-coupled SCR 116, the heater 112, and the first and second temperature sensors 106 and 114. In other embodiments, the exhaust after-treatment system 100 may include three, four, or any other number of independent heaters with respective temperature sensors. Each of the heaters and respective temperature sensors can have features corresponding to those described herein for the heater 112 and the first and second temperature sensors 106 and 114.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
operating a diesel engine of a heavy-duty truck such that the diesel engine generates an exhaust gas flow; and
while operating the diesel engine, operating an exhaust after-treatment system of the heavy-duty truck to maintain a temperature of the exhaust gas flow at a selective catalytic reduction system of the exhaust after-treatment system at a constant target temperature;
wherein operating the exhaust after-treatment system to maintain the temperature at the constant target temperature includes:
calculating a target energy level for the exhaust gas flow at the selective catalytic reduction system based on the constant target temperature, a mass flow rate of the exhaust gas flow, and a molar specific heat of the exhaust gas flow;
calculating a rate at which heat energy is provided from the diesel engine to the exhaust gas flow;
determining an operational level of fuel or power for a heater of the exhaust after-treatment system based on the target energy level and the rate at which heat energy is provided from the diesel engine to the exhaust gas flow;
operating the heater at the operational level of power:
calculating a rate at which heat energy is provided from the heater to the exhaust gas flow;
determining an expected value of the temperature using the calculated rates at which heat energy is provided from the diesel engine and the heater to the exhaust gas flow;
comparing the expected value of the temperature to a measurement of the temperature; and
adjusting operation of the exhaust after-treatment system based on a result of the comparison.

2. The method of claim 1 wherein the target temperature minimizes a fuel penalty incurred by operation of the selective catalytic reduction system while ensuring effective operation of the selective catalytic reduction system.

3. The method of claim 2 wherein the target temperature is at least 150 degrees Celsius.

4. The method of claim 2 wherein the target temperature is at least 190 degrees Celsius.

5. The method of claim 1 wherein the calculating the rate at which heat energy is provided from the diesel engine to the exhaust gas flow includes averaging a product of a temperature of the exhaust gas flow as it enters the exhaust after-treatment system, a mass flow rate of the exhaust gas flow, and a molar specific heat of the exhaust gas flow across a moving average window of time.

6. The method of claim 1 wherein the calculating the rate at which heat energy is provided from the heater to the exhaust gas flow includes averaging a level of power consumed by the heater across a moving average window of time.

7. The method of claim 1 wherein a lookup table is updated to replace the expected value of the temperature with the measured temperature.

8. The method of claim 1 wherein the adjusting operation of the exhaust after-treatment system based on a result of the comparison includes reducing fuel or power supplied to the heater when the measured temperature is greater than the expected value of the temperature.

9. The method of claim 1 wherein the adjusting operation of the exhaust after-treatment system based on a result of the comparison includes increasing power supplied to the heater when the measured temperature is less than the expected value of the temperature.

10. The method of claim 1, further comprising illuminating a malfunction indicator lamp in a cabin of the heavy-duty truck when the exhaust after-treatment system is unable to maintain the temperature at the constant target temperature.

11. The method of claim 1 wherein the method includes calculating a rate at which heat energy is provided from the diesel engine to the exhaust gas flow at a frequency of at least once every minute and calculating a rate at which heat energy is provided from the heater to the exhaust gas flow at a frequency of at least once every minute, for at least five minutes.

12. The method of claim 11 wherein the method includes determining an expected value of the temperature using the calculated rates at which heat energy is provided from the diesel engine and the heater to the exhaust gas flow at a frequency of at least once every minute, comparing the expected value of the temperature to the measured temperature at a frequency of at least once every minute, and adjusting operation of the exhaust after-treatment system based on a result of the comparison at a frequency of at least once every minute, for at least five minutes.

13. The method of claim 1 wherein the selective catalytic reduction system is a close-coupled selective catalytic reduction system.

14. The method of claim 1 wherein the selective catalytic reduction system is an underbody selective catalytic reduction system.

15. The method of claim 1 wherein the temperature is measured by a first temperature sensor downstream of the heater with respect to the exhaust gas flow.

16. The method of claim 15 wherein a temperature of the exhaust gas flow as it enters the exhaust after-treatment system is monitored by a second temperature sensor upstream of the heater with respect to the exhaust gas flow.

* * * * *